United States Patent [19]

Rom et al.

[11] 4,243,023
[45] Jan. 6, 1981

[54] SOLAR COLLECTOR

[75] Inventors: Frank E. Rom, Avon Lake; Carl J. Wenzler, North Ridgeville; William L. Maag, Strongsville, all of Ohio

[73] Assignee: Rom-Aire Solar Corporation, Avon Lake, Ohio

[21] Appl. No.: 907,787

[22] Filed: May 19, 1978

[51] Int. Cl.³ ................................................ F24J 3/02
[52] U.S. Cl. ................................................ 126/449
[58] Field of Search ............... 126/270, 271, 449, 432, 126/450; 237/1 A; 165/139, 177, 179

[56] References Cited

U.S. PATENT DOCUMENTS

| 2,680,437 | 6/1954 | Miller | 126/432 |
|---|---|---|---|
| 2,680,565 | 6/1954 | Lof | 126/271 |
| 3,412,728 | 11/1968 | Thomason | 126/271 |
| 3,436,908 | 4/1969 | Van Delic | 126/270 |
| 3,486,489 | 12/1969 | Huggins | 165/177 |
| 3,633,663 | 1/1972 | Tafel | 165/177 |
| 3,863,621 | 2/1975 | Schoenfelder | 126/449 |
| 4,090,497 | 5/1978 | Kelly | 126/432 |
| 4,092,978 | 6/1978 | Levine | 126/449 |

Primary Examiner—James C. Young
Attorney, Agent, or Firm—Fay & Sharpe

[57] ABSTRACT

A solar collector includes a plurality of panels overlapped along one direction such that each panel overlies a portion of one adjacent panel and underlies a portion of another adjacent panel to define overlapping areas. The panels are slightly transversely spaced from one another in the overlapping areas for flow of air therebetween to a plenum chamber at least partly enclosed by the panels. Heat absorbed by the panels from solar radiation is transferred to air flowing over the panels and through the spaces in the overlapping areas.

19 Claims, 12 Drawing Figures

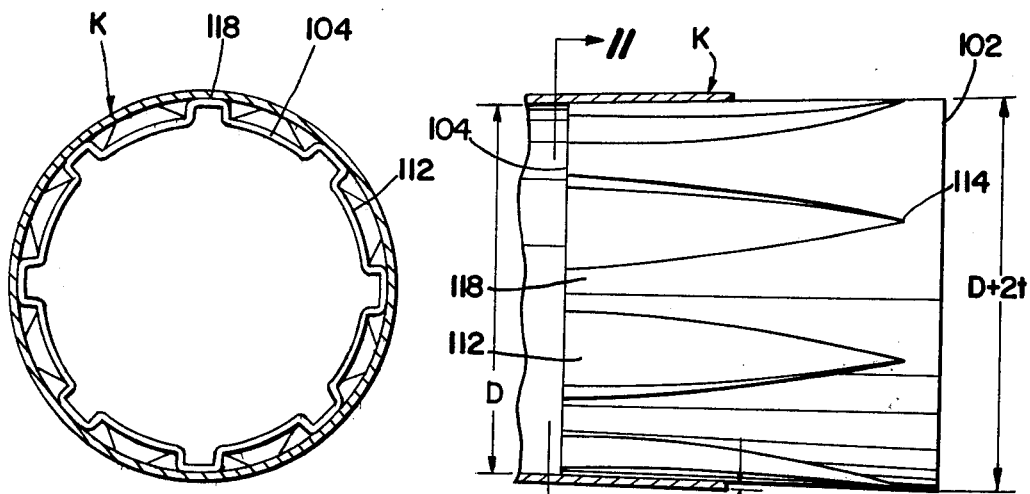
Fig. 11
Fig. 10
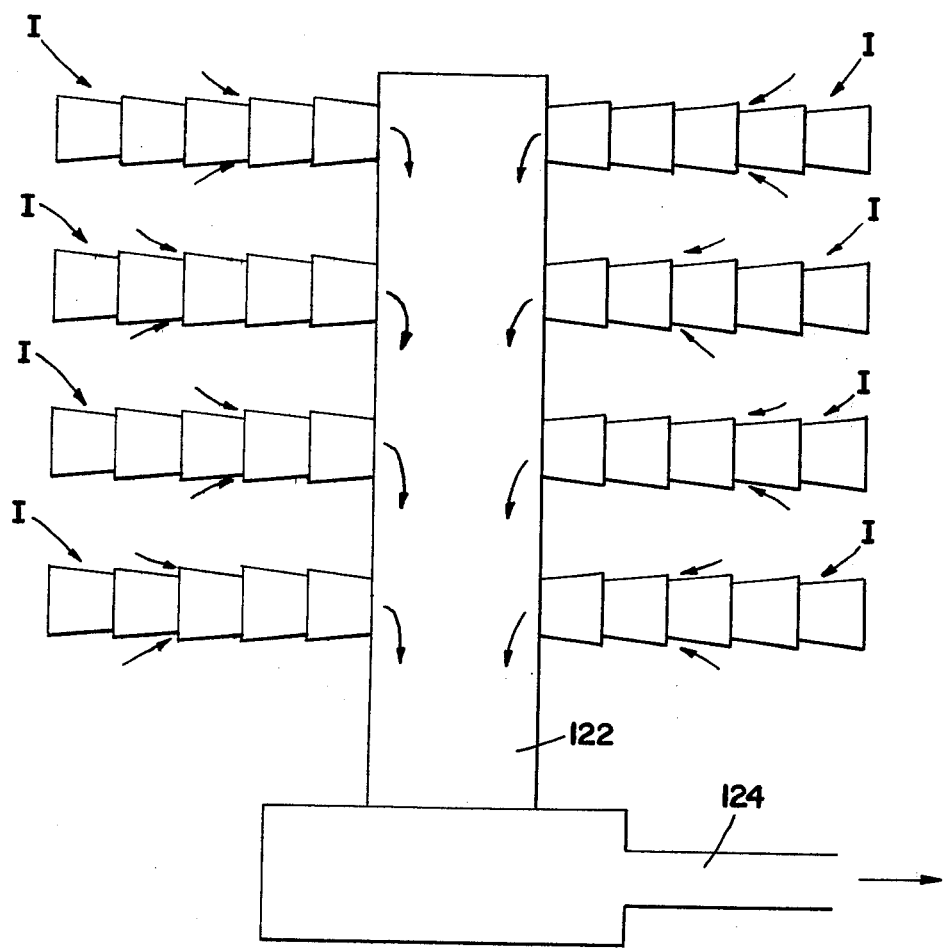
Fig. 12

SOLAR COLLECTOR

BACKGROUND OF THE INVENTION

This invention pertains to the art of heat exchangers and, more particularly, to solar collector-type of heat exchangers which absorb energy from the sun and transfer same to a moving air stream.

The invention is particularly applicable for use as a bare plate solar collector and will be particularly described with reference thereto. However, it will be appreciated to those skilled in the art that the invention has broader aspects and may, for example, be used with covered plate solar collectors to improve efficiency.

Conventional solar collectors for low temperature heating of air to around 70°-120° F. normally include a transparent glass or plastic cover positioned slightly above the black metal absorber plate. The transparent cover provides an opaque optical barrier to low wave length radiation emitting from the absorber plate and traps the thermal energy within the solar collector. The cover also forms an insulating layer of stagnant air above the absorber plate for reducing heat loss first by convection to the cover and then by conduction and convection from the cover to atmosphere. The transparent cover has the adverse effect of absorbing and reflecting a portion of the incoming solar radiation so that the absorber plate only sees between 80-90% of the incident solar flux reaching the cover.

In conventional solar collectors of the type described, heat is transferred from the back side of the absorber plate to air flowing past the back side of such plate. The efficiency of the heat transfer rate depends upon the magnitude of the film heat transfer coefficient which is usually limited by the allowable pressure drop through the air flow passage. Procedures for increasing the film heat transfer coefficient, while minimally affecting the pressure drop, help to improve the overall efficiency of the collector. One way of increasing the heat transfer coefficient is to induce turbulence or otherwise break up the thermal and hydraulic boundary layers adjacent the back side of the absorber panel. The effect of increasing the film heat transfer coefficient is to reduce the absorber plate temperature for given values of air inlet temperature and solar insolation. The efficiency of the solar collector is increased with a lower temperature for the absorber plate due to the substantially reduced heat loss from the front side of the plate.

The cost effectiveness of conventional solar collectors of the type described is not satisfactory due to the relatively high cost of the solar collectors. This cost can be substantially reduced by eliminating the transparent cover to form a bare plate solar collector. However, elmination of the transparent cover results in drastic reduction in efficiency because of the large heat loss from the absorber plate to the surrounding atmosphere.

Therefore, it would be desirable to have a bare plate solar collector which maintained a relatively high efficiency. The present invention is deemed to overcome the aforementioned problems and others and provide an efficient bare plate solar collector arrangement.

SUMMARY OF THE INVENTION

A bare plate solar collector capable of operating at a relatively high efficiency includes a plurality of absorber panels overlapped along one direction such that each panel, except for the end panels, overlies a portion of one adjacent panel and underlies a portion of another adjacent panel to define overlapping areas. The panels are slightly spaced from one another in the overlapping areas to facilitate flow of air therebetween to a plenum chamber at least partly surrounded by the panels and to provide a high heat transfer coefficient.

In one arrangement, the panels are corrugated or undulating along the one direction. This helps the panels to be self-sustaining when assembled into a collector structure and further aids in improving the film heat transfer coefficient at the panel surfaces by inducing turbulence. The corrugated or undulating arrangement also reduces loss of radiation and reflected solar radiation because a substantial portion of such radiation emitted or reflected from one surface area can be captured by adjacent surface areas instead of being lost to the atmosphere. The area of the plate exposed to solar radiation is also increased.

In another arrangement, each panel has leading and trailing portions which respectively underlie one adjacent panel and overlie another adjacent panel. Each panel is shaped such that the trailing portion is smaller than the leading portion by an amount generally equal to the thickness of the material from which the panel is made plus the spacing between adjacent panels in the overlapping areas. This arrangement conveniently provides the spacing between adjacent panels in the overlapping areas. Suitable spacers are positioned between the panels in the overlapping areas and fasteners assemblies secure the panels together.

The panels may be curved about an axis extending substantially parallel to the one direction in which they are overlapped. This provides the solar collector with a generally tubular or semi-cylindrical configuration.

Each panel may have a generally frusto-conical shape so the space between adjacent panels extends over substantially 360°. In this arrangement, the top surface portion of each panel exposed to the sun is related to the thermal conductivity and thickness of the material such that the temperature difference between the top and bottom surface portions of each panel is minimized. These panels may be provided with corrugations or undulations around their periphery extending generally parallel to their longitudinal axis.

It is a principal object of the present invention to provide an improved low cost solar collector.

It is another object of the invention to provide a bare plate solar collector having a relatively high efficiency.

It is also an object of the invention to provide a solar collector formed as a unitary structure including the absorber plate and flow passages.

It is another object of the invention to provide a solar collector which is suitable for fully automatic production.

It is an additional object of the invention to provide a solar collector having very low labor and material costs by eliminating or substantially minimizing the use of insulation, extra structural members and housings or the like.

It is an additional object of the invention to provide a solar collector having self-sustaining plates assembled together.

It is a further object of the invention to provide an improved solar collector which is relatively simple and inexpensive to manufacture and assemble.

Still other objects and advantages will become apparent to those skilled in the art upon a reading and understanding of this specification.

BRIEF DESCRIPTION OF THE DRAWINGS

The invention may take physical form in certain parts and arrangements of parts, a preferred and alternative embodiments of which will be described in detail in this specification and illustrated in the accompanying drawings which form a part hereof and wherein:

FIG. 10 is a side elevational view of another form of collector plate;

FIG. 11 is a cross-sectional elevational view taken generally on line 11—11 of FIG. 10; and, FIG. 12 is a schematic illustration of a solar collector having a plurality of structures like that of FIG. 6 connected to a common header.

DESCRIPTION OF PREFERRED EMBODIMENTS

Figure 1:
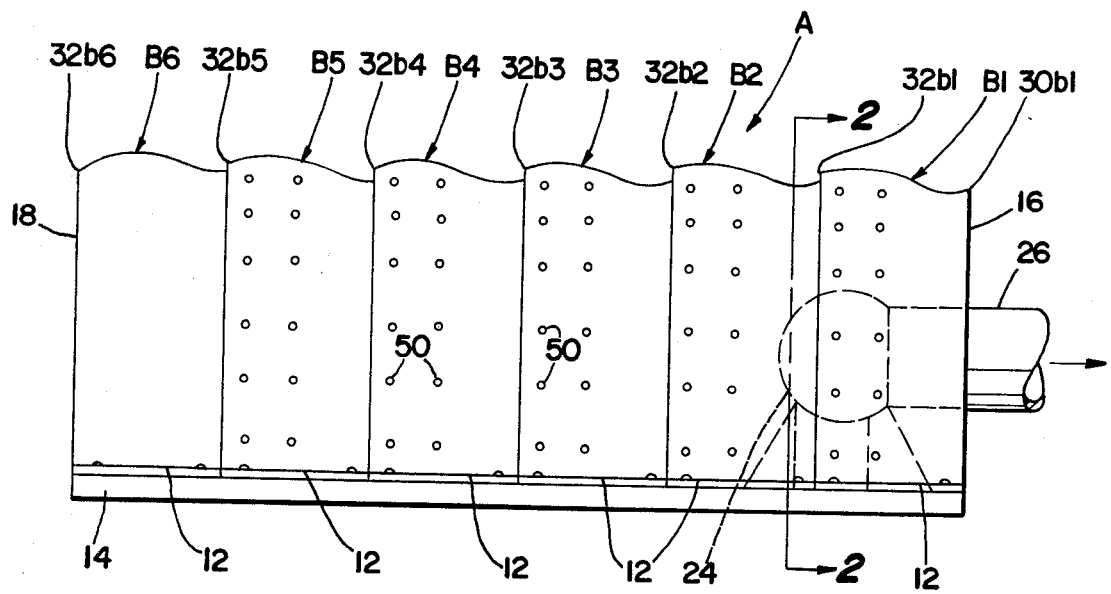
FIG. 1 is a side elevational view of a solar collector having the features of the present application incorporated thereinto.

Referring now to the drawings, wherein the showings are for purposes of illustrating certain preferred and alternative embodiments of the invention only and not for purposes of limiting same, FIG. 1 shows a solar collector A formed by a plurality of absorber plates B1–B6 overlapped along one direction from right to left in FIG. 1 such that each plate, except for end plates B1 and B6, overlies a portion of one adjacent plate and underlies a portion of another adjacent plate.

Figure 2:
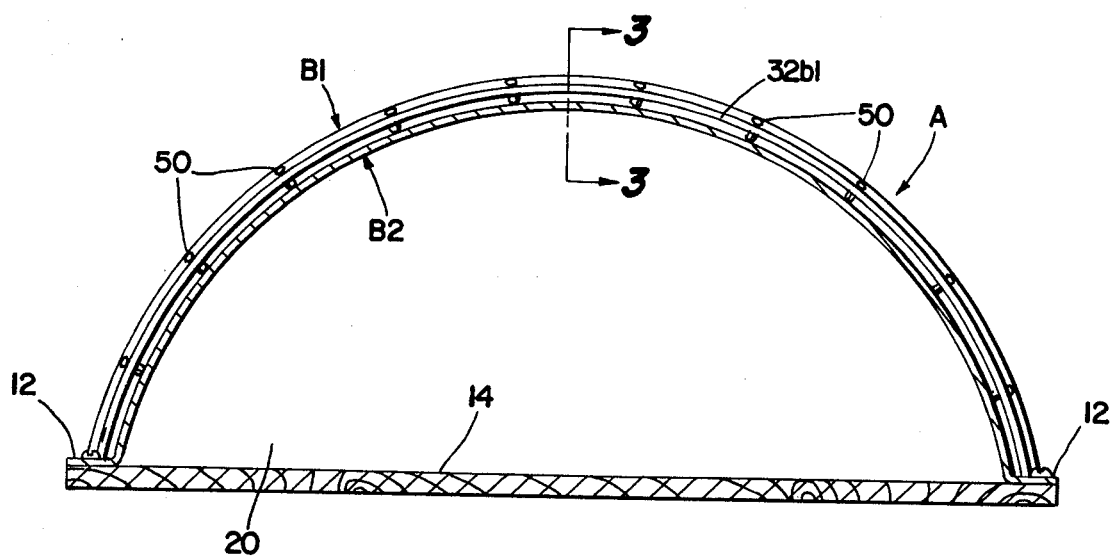
FIG. 2 is a cross-sectional elevational view taken generally on lines 2—2 of FIG. 1.

Plates B1–B6 are curved about an axis extending parallel to the one direction in which the plates are overlapped. In the arrangement shown, plates B1–B6 are curved about an axis extending perpendicular to the plane of the paper in FIG. 2. Plates B1–B6 have outwardly extending opposite flanges 12 suitably secured to a base 14. Suitable end walls indicated generally at 16,18 in FIG. 1 are suitably secured to end plates B1 and B6 to cooperate with the plates and base 14 for defining a plenum chamber 20. It will be recognized that plenum chamber 20 may be considered as being at least partly enclosed by plates B1–B6, and that plenum chamber 20 is defined beneath plates B1–B6. Means for inducing air flow into plenum chamber 20 may take many forms and is shown by way of illustration as a blower 24 positioned within the chamber for exhausting air therefrom through duct 26. A plurality of collectors A can be connected with a common header or manifold which delivers the solar heated air to the desired location of use.

Figure 3:
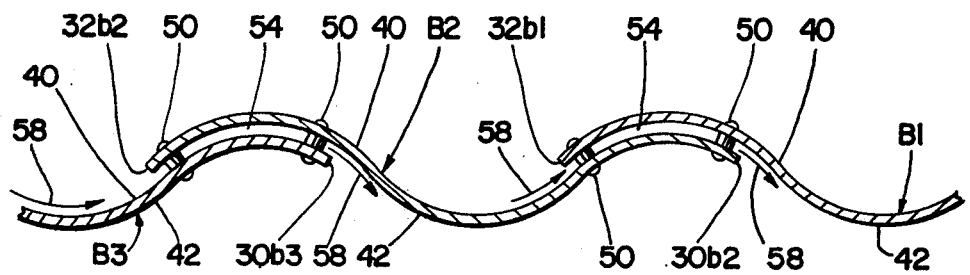
FIG. 3 is a partial cross-sectional elevational view taken generally along lines 3—3 of FIG. 2.

As best shown in FIG. 3, plate B2 has a leading edge 32$b$2 and a trailing edge 30$b$2. The other plates have corresponding leading and trailing edges, with plate B1 in FIG. 3 being shown with leading edge 32$b$1 and plate B3 being shown with trailing edge 30$b$3. Each plate B1–B6 has outer and under surfaces 40,42.

In the arrangement shown, that portion of plate B2 extending from edge 30$b$2 to edge 32$b$1 underlies plate B1, while that portion of plate B2 extending from edge 30$b$3 to edge 32$b$2 overlies plate B3. This overlapping arrangement defines overlapping areas and the adjacent plates in these areas are secured together in slightly spaced relationship by suitable fastener assemblies 50 which may take many alternative forms. For example, fastener assemblies 50 may comprise spacer sleeves positioned between adjacent plates, and pop rivets extending through the sleeves and suitable holes in the plates. The overlapping areas and the relatively small spaces between adjacent plates in the overlapping areas are both generally indicated by numeral 54.

Plates B1–B6 are preferably made of a material having a low cost and a high thermal conductivity. For example, aluminum is a good material for this purpose; however, it will be recognized that other materials, including steel or plastics, can be used for certain applications. The surfaces of the plates are preferably treated to thereby render the plates good absorbers of solar energy, and to improve their corrosion resistance and general weatherability. For example, these surfaces can be roughened, painted with a dull black paint, or coated with any suitable coating including selective absorber coatings, e.q. black chrome or black anodization. Preferably, in all embodiments, both the inside and outside surfaces of the collector plates are provided with the coating for enhancing radiation from hot spots to colder areas and to enhance absorption of such radiation by the colder areas. This helps to eliminate hot spots and promotes uniform temperatures for improving efficiency.

In the arrangement shown, radiation from the sun is absorbered on outer surface 40 of plate B2 extending from edge 32$b$2 to edge 32$b$1. The high thermal conductivity of the plate results in distribution of this heat along the entire length of plate B2 between its edges 32$b$2 and 30$b$2. The temperature of each plate will tend to be uniform and this minimizes excessive heat loss which might be caused by hot spots of high temperature. Heat is removed from plate B2 in the area between edges 32$b$2 and 30$b$3 by heat transfer to the air flowing through space 54 at a relatively high velocity into the plenum chamber as indicated generally by arrows 58. Heat is removed from that portion of plate B2 extending between edges 30$b$3 and 32$b$1 by conduction toward overlapping areas 54 and by the jet of air 58 issuing from one space 54 adjacent edge 30$b$3 to flow into space 54 adjacent edge 32$b$1. Heat conducted to that portion of plate B2 extending between edges 32$b$1 and 30$b$2 is removed by the air jet 58 flowing in space 54 therebetween.

The improved heat transfer efficiency produced in the manner described hereinabove by the combined conduction, convection and radiation serves to reduce the temperature of plate B2 between edges 32$b$2 and 32$b$1 well below that for an ordinary flat plate solar collector. The lower surface temperature of the plates results in lower radiation and convection heat losses to atmosphere to greatly improve the efficiency of the solar collector.

In the arrangement shown and described, plates B1-B6 are undulating or corrugated in the one direction of overlap. This aids in rendering the plates and collector structure self-sustaining, and also increases the area of each plate which is exposed to solar radiation. The undulations can also extend in the opposite direction to improve absorption of solar energy and structural rigidity. In the arrangement shown in FIG. 3, each plate is curved in a manner which will be described for plate B2. The opposite portions of plate B2 curve upwardly toward one another from edges 30b2 and 32b2. These opposite portions of plate B2 then curve downwardly toward one another and toward the center of plate B2. In the arrangement shown, plate B2 is smoothly curved and has a transverse cross-sectional configuration which may be considered as a very shallow M-shape. The opposite convex end portions are separated by a concave central portion.

When essentially flat plates of the described shape are used instead of plates which are curved to form a culvert-like structure, the concave central portion may include small openings or holes therein for allowing rain water or the like to pass through into the plenum chamber. The entire collector is then positioned at an angle so that water entering the plenum chamber will fall on support base 14 and run toward one of ends 16, 18 which is advantageously provided with suitable small openings for allowing the water to drain. The solar collector could then be positioned inclined downwardly from right to left in FIG. 3 so that rain would tend to drain off the structure without flowing between spaces 54. However, rain could flow through such spaces without materially affecting the preformance of the collector.

In the arrangement shown, the underlying portion of plate B2 adjacent trailing edge 30b2 thereof is made smaller than the overlying portion thereof adjacent leading edge 32b2 by an amount substantially equal to the thickness of the plate material plus the thickness of a space 54. This allows overlapping of adjacent plates with a slight space therebetween without resulting in a step-like rise of the structure from one end to the other as the plates are assembled. That is, all of the plates may be secured to a flat base 14 and extend essentially along a straight line.

The plates are positioned in staggered overlapping relationship along one direction in the manner shown and described. Each plate, such as plate B2 in FIG. 3, has an exposed outer surface length from leading edge 32b2 thereof to the leading edge 32b1 of an adjacent plate and a concealed length between its trailing edge 30b2 and the leading edge 32b1 of the adjacent plate B1. The concealed length of a plate is typically around one third of its total length. However, the concealed length could be around one half the total length of a plate and this would provide a larger heat transfer surface to pull heat from the exposed portion. With increasing concealed length, there is increasing cost because more metal is required. The optimum overlap is a compromise between cost and performance, and the length over which each panel overlaps an adjacent panel will usually be around 25-50% of the total panel length. Thus, with reference to FIG. 3, if the distance between 32b2 and 30b3 is 25-50% of the distance between 32b2 and 30b2, then the distance between 32b2 and 30b3 is approximately 33⅓-100% of the outer exposed surface length of the plate between 32b2 and 32b1.

Figure 4:
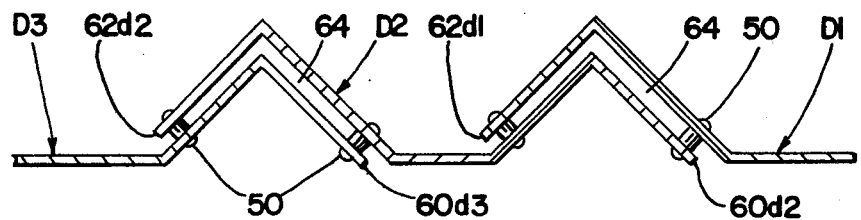
FIG. 4 is a partial cross-sectional elevational view similar to FIG. 3 and showing a modified form of plate.

FIG. 4 shows another arrangement generally similar to FIG. 3 but having plates D1-D3 which are bent sharply instead of being smoothly curved or corrugated. However, plates D1-D3 still undulate in the direction of overlap. Each plate, such as plate D2, has an inverted V-shaped configuration adjacent trailing edge 60d2 thereof and another inverted V-shaped configuration adjacent leading edge 62d2 thereof. The inverted V-shaped configuration adjacent the leading edge is smaller than the corresponding configuration adjacent the trailing edge by an amount substantially equal to the thickness of the plate material plus the thickness of space 64 in the overlapping areas between adjacent plates. The plates are secured together by suitable fastener assemblies 50 in a manner such as that previously described. The inverted V-shaped configurations adjacent the leading and trailing edges of each plate are separated by a central portion which may have small holes therein for drainage if so desired. Leading edge 62d1 of plate D1 is shown in FIG. 4 along with trailing edge 60d3 of plate D3.

Figure 5:
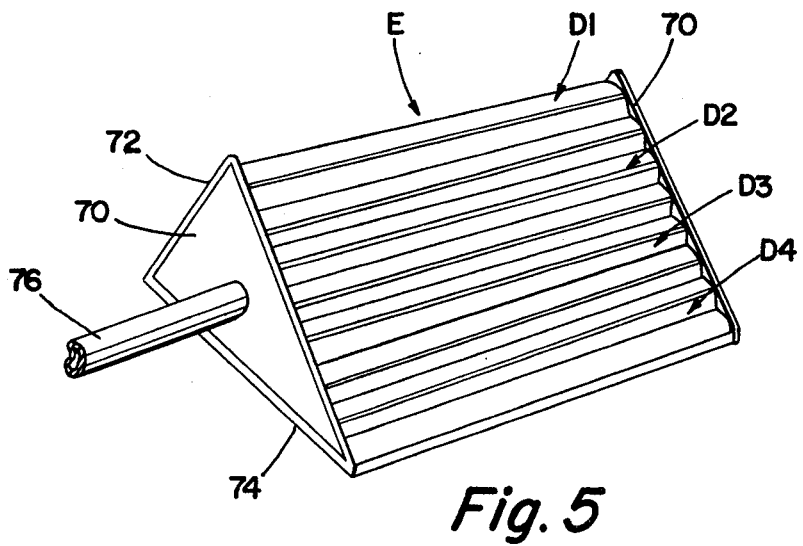
FIG. 5 is a schematic perspective illustration of a solar collector having the plates of FIG. 4 incorporated thereinto.

FIG. 5 shows a plurality of plates D of FIG. 4 assembled into a solar collector E. An assembly of plates D1-D4 cooperate with opposite end walls 70, rear wall 72 and bottom wall 74 to define a generally triangular configuration enclosing a plenum chamber having a duct 76 suitably communicating therewith. Means for evacuating the plenum chamber causes the inflow of air through spaces 64 between adjacent plates D1-D4. It will be recognized that duct 76 can be much larger in diameter than shown and, in fact, may be as large as triangular area 70. The length of solar collector E between its opposite end walls 70 can be hundreds of feet. A plurality of collectors E can also be connected with a common header which delivers the solar heated air to its location of use.

Figure 6:
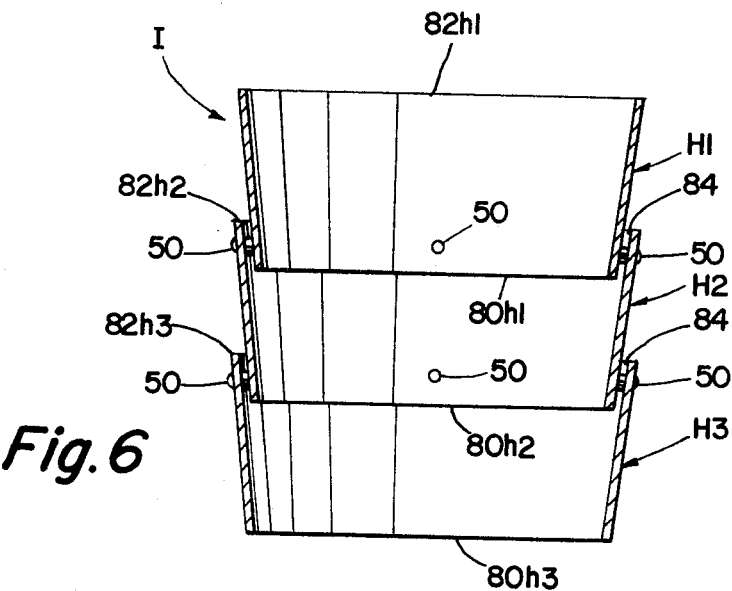
FIG. 6 is a cross-sectional plan view of another form of solar collector having the concepts of the present invention incorporated thereinto.
Figure 7:
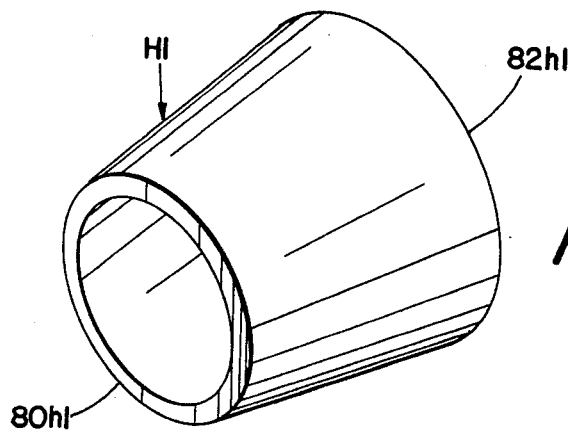
FIG. 7 is a perspective illustration of a plate used to assemble the solar collector of FIG. 6.

FIGS. 6 and 7 show a generally frusto-conical plate member H1 of aluminum or the like suitably coated inside and out as previously described to be a good absorber of solar radiation and to minimize hot spots. Plate H1 has a generally circular or elliptical trailing edge 80h1 of one size and a generally circular or elliptical leading edge 82h1 of a slightly larger size. A plurality of plates H1-H3 are positioned in overlapping relationship as shown in FIG. 6 to form a solar collector I, with a trailing edge 80h1 extending past a leading edge 82h2 of an adjacent plate, and with adjacent plates suitably secured together as by fastener assemblies 50. This provides an annular space 84 in the overlapping areas extending substantially 360° therearound and being interrupted only by widely-spaced fastener assemblies 50.

Suitable end walls are provided on the collector and a blower is provided for evacuating the plenum chamber defined within plates H1-H3. This causes a high velocity flow of air through spaces 84 to remove heat from both interior and exterior surfaces of the plates. The high thermal conductivity of the plates causes the collector to operate at a high efficiency due to the lower temperature of the plates. Although many different sizes of plates may be used, an example of one plate size will be given simply by way of example for a plate in the shape of a truncated cone. Plate H1 may have an axial length between edges 80h1 and 82h1 of approximately 8". Edge 80h1 has an external diameter of approximately 11⅞". Leading edge 82h1 has an external diameter of approximately 12". Trailing edge 80h1 extends past leading edge 82h2 approximately 2". Thus, the radial thickness of annular space 84 is slightly less than 1/16". The thickness of the material may be approximately 1/32". The plenum chamber defined by plates H1–H3 is evacuated so that air flows from top to bottom in the view of FIG. 6 through annular spaces 84.

In the arrangement of FIGS. 6 and 7, approximately the top half of each plate will be exposed to the sun while the bottom half thereof will be concealed from the sun. The top surface portion which is exposed to the sun is preferably related to the thermal conductivity of the material and the material thickness such that the temperature difference between the top and bottom surface portions is minimized. More particularly, it is extremely desirable for the most efficient solar collector operation to have the ratio of collector surface area which is exposed to the sun, to the product of the thermal conductivity and the thickness of the material from which the collector is made, be such that the temperature difference between the top and bottom of the collector be kept at a minimum. This arrangement allows the solar collector to operate at a higher efficiency due to its lower operating temperature and heat is more efficiently removed over a larger surface area by air flowing at a high velocity through annular spaces 84.

It will be recognized that the plates of FIGS. 6 and 7 can also be undulating or corrugated in the axial and/or the circumferential directions if so desired. In addition, it will be recognized that many other shapes and arrangements are possible. For example, it is possible to spirally wind a single strip into a culvert-like configuration while leaving small annular spaces between adjacent convolutions of the spiral for accommodating a flow of air therethrough to the interior of the spiral which defines a plenum chamber.

Figures 8, 9:
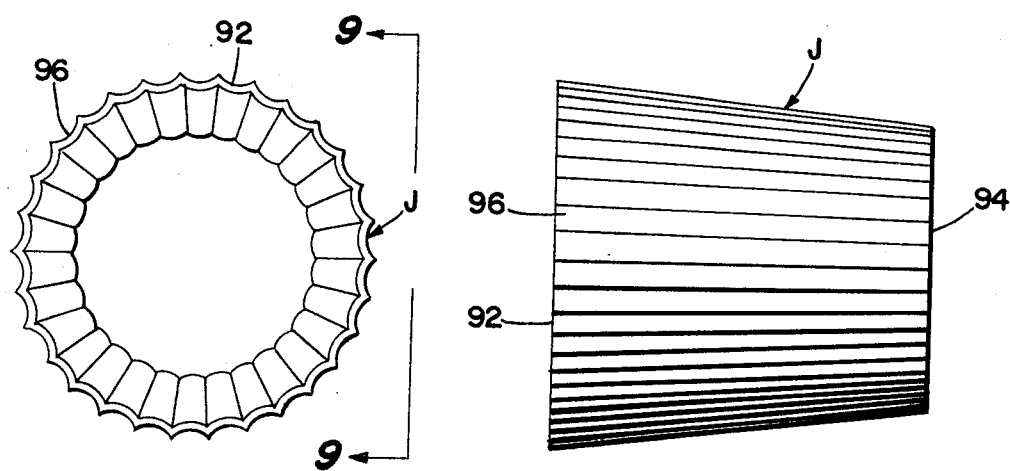
FIG. 8 is an end elevational view of another form of collector plate.
FIG. 9 is a side elevational view taken generally on line 9—9 of FIG. 8.

FIGS. 8 and 9 show another plate J similar to plate H1 of FIG. 7. Plate J is shown as being generally frusto-conical, although it will be recognized that other hollow shapes could be used. One end 92 is slightly larger in size than opposite end 94, and both ends are of similar shape. Longitudinal undulations or flutes 96 are provided in the periphery of plate J. Undulations 96 have a larger cross-sectioning size adjacent end 92 than adjacent end 94 so the grooves defined by the undulations taper to a smaller size from end 92 toward end 94.

FIGS. 10 and 11 show a plate K of generally frusto-conical or other hollow shape and having a wall thickness t. End 102 has an external diameter D plus 2t, while end 104 has an external diameter D, so a plurality of the plates can be assembled together with an end 104 of one received in an end 102 of another. Circumferentially-spaced longitudinally extending flutes 112 are formed to extend generally radially inwardly in plate K. Flutes 112 extend from end 104 to flute ends 114 spaced longitudinally from plate end 102. Flutes 112 may be considered to taper by increasing in depth and width from flute ends 114 toward plate end 104. However, many other shapes and arrangements are possible. When adjacent plates are assembled together, fasteners may extend through plate portions 118 between flutes 112 adjacent end 104, and that portion of the plate between flute ends 114 and plate end 102. The circumferential width and the radial depth of flutes 112 can be varied to obtain optimum performance and strength. A flat metal strip can be fluted as shown and described, and spirally wound to form an elongated solar collector.

FIG. 12 shows a large elongated header or manifold 122 having a plurality of solar collectors I communicating therewith. Air heated by solar energy with collectors I is drawn into header 122 and delivered through outlet 124 to a location of use. Plates J and K can also be used in an arrangement like that of FIG. 12.

The plates of FIGS. 6–11 form solar collectors which are generally tubular or elongated hollow structures having a plurality of longitudinally-spaced circumferential air inlets. The inlets extend more generally parallel to the longitudinal axis of the collector than radially thereof.

The length of overlap between adjacent plates for all embodiments is preferably approximately 25–50% of the total length of each plate, thereby providing adequate surface area within the overlapping areas for transfer of heat to the high velocity air stream flowing through the small spaces.

The above described arrangements render it possible to operate a solar collector at relatively high efficiency without requiring a transparent cover for the absorber plate. However, it will be recognized that the features of the present invention could be used on solar collectors of the type having transparent covers if so desired. The efficiency of the covered collector will be increased over conventional flat plate collectors by so doing.

Although the invention has been shown and described with respect to preferred and alternative embodiments, modifications and alterations will occur to others upon a reading and understanding of this specification. The present invention includes all such modifications and alterations insofar as they come within the scope of the appended claims or the equivalents thereof.

Having thus described the invention, it is now claimed:

1. A solar collector comprising: a plurality of absorber plates of opaque material having a high thermal conductivity and having outer surfaces highly absorptive of solar energy, each said plate having opposite overlying and underlying portions, said plates being overlapped along one direction such that each plate, except for the end plates, has said overlying portion thereof overlying an underlying portion of one adjacent plate and has said underlying portion thereof underlying an overlying portion of another adjacent plate to define a plurality of overlapping areas spaced along said one direction, said plates being slightly spaced from one another in said overlapping areas transversely of said one direction to define spaces through which air flows from said outer surfaces toward the opposite surfaces of said plates, each said plate having a predetermined dimension generally along said one direction and the dimension of said underlying portion generally along said one direction being approximately 25–50% of said predetermined dimension, each said plate having a bottom surface facing away from the sun and said outer surface thereof being exposed to the sun, each said plate being of a material having a predetermined thermal conductivity and a predetermined thickness, and said outer surface being related to said thermal conductivity and thickness such that the temperature difference between said outer and bottom surfaces is minimized.

2. The solar collector as defined in claim 1 wherein said plates undulate at least along said one direction.

3. The solar collector as defined in claim 1 wherein each said plate is shaped such that said underlying portion is smaller than said overlying portion by an amount generally equal to the thickness of the material from which each said plate is made plus the spacing between adjacent plates in said overlapping areas.

4. The solar collector as defined in claim 3 wherein said plates are curved about an axis extending substantially parallel to said one direction.

5. The solar collector as defined in claim 4 wherein each said plate has a generally frusto-conical shape.

6. The solar collector as defined in claim 1 wherein each said plate is generally tubular and is longitudinally fluted.

7. The solar collector as defined in claim 1 wherein said plates at least partly enclose a plenum chamber, means for inducing air flow into said chamber through said spaces between adjacent plates in said overlapping areas, and said chamber being substantially closed to entry of air thereinto except through said spaces so that substantially all of the air entering said chamber flows through said spaces.

8. The solar collector as defined in claim 1 wherein said plates overlap one another along a predetermined direction and are curved about an axis extending generally parallel to said predetermined direction.

9. A solar collector comprising: a plurality of overlapping plates beneath which a plenum chamber is defined, said plates being of opaque material having a high thermal conductivity and having outer surfaces highly absorptive of solar energy, said plates being of substantially the same size and shape and each said plate overlapping an adjacent plate in an overlapping area at which said plates are slightly spaced from one another to define spaces for high velocity flow of air therethrough to said plenum chamber, means for inducing air flow into said chamber through said spaces, said chamber being substantially closed to entry of air thereinto except through said spaces so that substantially all of the air entering said chamber flows through said spaces, each said plate having a bottom surface facing away from the sun and said outer surface thereof being exposed to the sun, each said plate being of a material having a predetermined thermal conductivity and a predetermined thickness, and said outer surface being related to said thermal conductivity and thickness such that the temperature difference between said outer and bottom surfaces is minimized.

10. The solar collector as defined in claim 9 wherein each said overlapping area has a length which is approximately 25-50% of the total length of each plate.

11. The collector as defined in claim 9 wherein said plates are defined by individual hollow members of the same size and shape, each said hollow member having opposite overlying and underlying end portions of different size to define said spaces in said overlapping areas, each said overlapping area having a length which is approximately 25-50% of the total length of each plate, and each said hollow member being longitudinally fluted at least along said underlying portion thereof.

12. The collector as defined in claim 11 wherein said hollow members are substantially frusto-conical.

13. The solar collector as defined in claim 9 wherein said plates have leading and trailing edges, each said plate in transverse section being formed with portions which extend upwardly toward one another from said leading and trailing edges thereof and then extend downwardly toward one another and toward the center of the plate.

14. The solar collector as defined in claim 9 wherein said plates have under surfaces and both said outer and under surfaces are provided with absorber coatings for enhancing temperature uniformity of said plates.

15. The solar collector as defined in claim 9 wherein said plates overlap one another along a predetermined direction and are undulating at least along said predetermined direction.

16. A solar collector comprising: a plurality of overlapping plates beneath which a plenum chamber is defined, said plates being of opaque material having a high thermal conductivity and having outer surfaces highly absorptive of solar energy, said plates being of substantially the same size and shape and each said plate overlapping an adjacent plate in an overlapping area at which said plates are slightly spaced from one another to define spaces for high velocity flow of air therethrough to said plenum chamber, means for inducing air flow into said chamber through said spaces, said chamber being substantially closed to entry of air thereinto except through said spaces so that substantially all of the air entering said chamber flows through said spaces, said plates being defined by individual hollow members of the same size and shape, each said hollow member having opposite ends of similar shape but of different size, each said hollow member having an underlying portion and an overlying portion, and each said member being longitudinally fluted at least along said underlying portion thereof.

17. A solar collector comprising: a plurality of overlapping plates beneath which a plenum chamber is defined, said plates being of opaque material having a high thermal conductivity and having outer surfaces highly absorptive of solar energy, said plates being of substantially the same size and shape and each said plate overlapping an adjacent plate in an overlapping area at which said plates are slightly spaced from one another to define spaces for high velocity flow of air therethrough to said plenum chamber, means for inducing air flow into said chamber through said spaces, said chamber being substantially closed to entry of air thereinto except through said spaces so that substantially all of the air entering said chamber flows through said spaces, each said plate having opposite overlying and underlying end portions, each said plate having a plurality of transversely-spaced longitudinal flutes extending throughout said underlying end portion, and said flutes having a length greater than the length of said underlying portion and less than the entire length of each said plate.

18. The solar collector as defined in claim 17 wherein said plates are hollow members having opposite overlying and underlying edges, each said member having an external peripheral size at said overlying edge which is greater than the external peripheral size of said underlying edge by an amount approximately equal to two times the thickness of the material forming each said member.

19. The solar collector as defined in claim 18 wherein said hollow members are generally frusto-conical and have said overlying and underlying portions thereof secured together in areas between said flutes.

* * * * *